United States Patent
Cox et al.

(10) Patent No.: US 10,948,676 B2
(45) Date of Patent: Mar. 16, 2021

(54) DEVICES, SYSTEMS, AND METHODS FOR FLEXIBLE, DEPLOYABLE STRUCTURE WITH OPTICAL FIBER

(71) Applicant: ROCCOR, LLC, Longmont, CO (US)

(72) Inventors: Kevin Cox, Boulder, CO (US); Dana Turse, Broomfield, CO (US); Mark Lake, Erie, CO (US)

(73) Assignee: Roccor, LLC, Longmont, CO (US)

( * ) Notice: Subject to any disclaimer, the term of this patent is extended or adjusted under 35 U.S.C. 154(b) by 0 days.

(21) Appl. No.: 16/362,669

(22) Filed: Mar. 24, 2019

(65) Prior Publication Data
US 2019/0317293 A1    Oct. 17, 2019

Related U.S. Application Data

(60) Provisional application No. 62/647,663, filed on Mar. 24, 2018.

(51) Int. Cl.
G02B 6/44     (2006.01)
G01M 11/00    (2006.01)
G02B 6/46     (2006.01)

(52) U.S. Cl.
CPC .......... *G02B 6/4471* (2013.01); *G01M 11/37* (2013.01); *G02B 6/46* (2013.01)

(58) Field of Classification Search
CPC ... G01M 11/085; G01M 11/37; G02B 6/4471; G02B 6/46
See application file for complete search history.

(56) References Cited

U.S. PATENT DOCUMENTS

| | | | |
|---|---|---|---|
| 6,559,437 B1 * | 5/2003 | Pope, Jr. .............. | G01M 11/086 250/227.14 |
| 10,180,337 B1 * | 1/2019 | Bradbury ............ | G01D 5/35303 |
| 2010/0092127 A1 * | 4/2010 | Sasaoka ............... | G01M 11/085 385/12 |
| 2017/0102278 A1 * | 4/2017 | Briffod ................... | G01L 1/242 |

OTHER PUBLICATIONS

Davis et al., "High Performance Electrical Conductors in Composite Slit-Tube Booms", AIA SciTech Forum, Jan. 2015 (Year: 2015).*

(Continued)

*Primary Examiner* — Hina F Ayub
(74) *Attorney, Agent, or Firm* — Wilson Patent Law, LLC

(57) ABSTRACT

Devices, systems, and methods for flexible, deployable structures with optical fiber are provided in accordance with various embodiments. For example, some embodiments include a system that may include a flexible, deployable structure and one or more optical fibers coupled with the flexible, deployable structure. In some embodiments, one or more conditions of the one or more optical fibers coupled with a flexible, deployable structure may be determined. One or more conditions of the flexible, deployable structure may be determined utilizing the determined one or more conditions of the one or more optical fibers coupled with the flexible, deployable structure. The one or more conditions of the one or more optical fibers may be correlated to the one or more conditions of the flexible, deployable structure.

16 Claims, 14 Drawing Sheets

(56) References Cited

OTHER PUBLICATIONS

Cox, Kevin, et al., "Exploring the Behaviour of Self-Deployed Composite Booms Using High-Definition Fiber Optic Sensing," European Conference on Spacecraft Structures, Materials and Environmental Testing, May 28-Jun. 1, 2018.

Guo, Jingjing, et al., "Highly flexible and stretchable optical strain sensing for human motion detection," Optica, vol. 4, No. 20, Oct. 2017, pp. 1285-1288.

Zhang, Jingdong, et al,"Modulated Pulses Based Spatial Resolution Distributed Fiber System for Multi-Parameter Sensing," Optics Express, vol. 24, Issue 24, 2016, pp. 27482-27493.

* cited by examiner

← 600

Couple one or more optical fibers with flexible, deployable structure — 610

FIG. 6

DEVICES, SYSTEMS, AND METHODS FOR FLEXIBLE, DEPLOYABLE STRUCTURE WITH OPTICAL FIBER

CROSS-REFERENCES TO RELATED APPLICATIONS

This application is a non-provisional patent application claiming priority benefit of U.S. provisional patent application Ser. No. 62/647,663, filed on Mar. 24, 2018 and entitled "DEVICES, SYSTEMS, AND METHODS FOR DEPLOYABLE BOOM WITH OPTICAL FIBER," the entire disclosure of which is herein incorporated by reference for all purposes.

GOVERNMENT LICENSE RIGHTS

This invention was made with government support under Contract NNX17CL86P awarded by the National Aeronautics and Space Administration. The government has certain rights in the invention.

BACKGROUND

Understanding the behavior of the underlying structure of high-strain composite materials, such as those that may be utilized for deployable booms or flexible, deployable structures more generally, may provide different challenges. There may be a need for new tools and techniques to address how to understand this behavior, which may allow for better deployment control and/or understanding of response to operational and/or thermal loads, for example.

SUMMARY

Devices, systems, and methods for flexible, deployable structure with optical fiber are provided in accordance with various embodiments. For example, some embodiments include a system that may include a flexible, deployable structure and one or more optical fibers coupled with the flexible, deployable structure.

In some embodiments, the flexible, deployable boom includes a slit-tube boom. The flexible, deployable structure may include a high strain composite material. In some embodiments, the flexible, deployable structure includes at least a lenticular boom, a triangular rollable and collapsible boom, a hinge, or a tape spring.

In some embodiments, the one or more optical fibers coupled with the flexible, deployable structure include at least one optical fiber adhered to a surface of the flexible, deployable structure. In some embodiments, the one or more optical fibers coupled with the flexible, deployable structure include at least one optical fiber embedded between two or more layers of the flexible, deployable structure.

In some embodiments, the one or more optical fibers include one or more fiber optic sensors. The one or more fiber optic sensors may be configured to facilitate determining an extent of deployment of the flexible, deployable structure. Determining the extent of deployment of the flexible, deployable structure may include determining a change in strain of the one or more fiber optic sensors. In some embodiments, the one or more optical fibers include at least two fiber optic sensors.

In some embodiments, the one or more fiber optic sensors are configured to facilitate determining a deployed shape of the flexible, deployable structure. Determining the deployed shape of the flexible, deployable structure may include determining at least a twist of the flexible, deployable structure, a symmetry of the flexible, deployable structure, a creep recovery of the flexible, deployable structure, an axial response of the flexible, deployable structure, or a transverse response of the flexible, deployable structure, which may be determined based on one or more conditions of the one or more fiber optic sensors.

In some embodiments, the one or more fiber optic sensors are configured to facilitate determining a temperature of the flexible, deployable structure. In some embodiments, the one or more optical fibers include one or more optical fibers configured for data transmission from one or more components coupled with the flexible, deployable structure. Some embodiments include the one or more components coupled with the flexible, deployable structure such that one or more optical fibers configured for data transmission transmit data from the one or more components.

In some embodiments, the one or more optical fibers run axially with respect to the flexible, deployable structure. In some embodiments, the one or more optical fibers run at least in a circumferential path or in a serpentine path with respect to the flexible, deployable structure. In some embodiments, at least one of the at least two fiber optic sensors is utilized at least for redundancy or for improved precision. Some embodiments include one or more light sources coupled with the one or more optical fibers and one or more receivers configured to receive light from the one or more optical fibers.

Some embodiments include a method that may include determining one or more conditions of one or more optical fibers coupled with a flexible, deployable structure and determining one or more conditions of the flexible, deployable structure utilizing the determined one or more conditions of the one or more optical fibers coupled with the flexible, deployable structure.

In some embodiments, determining the one or more conditions of the flexible, deployable structure utilizing the determined one or more conditions of the one or more optical fibers coupled with the flexible, deployable structure include determining a change in strain of the one or more optical fibers. In some embodiments, the change in strain of the one or more optical fibers is correlated to a change in physical strain of the flexible, deployable structure. Determining the one or more conditions of the flexible, deployable structure may include determining an extent of deployment of the flexible, deployable structure utilizing the determined change in strain of the one or more optical fibers.

In some embodiments, determining the one or more conditions of the one or more optical fibers coupled with the flexible, deployable structure include scanning the one or more optical fibers with a light source. Determining the one or more conditions of the one or more optical fibers coupled with the flexible, deployable structure may further include performing a cross-correlation of a reference data set with a reflected spectrum produced from scanning the one or more optical fibers.

In some embodiments, determining the one or more conditions of the flexible, deployable structure includes determining a temperature of the flexible deployable, deployable structure utilizing the determined one or more conditions of the one or more optical fibers. In some embodiments, determining the one or more conditions of the flexible, deployable structure includes determining a deployed shape of the flexible, deployable structure utilizing the determined one or more conditions of the one or more optical fibers. In some embodiments, determining the one or more conditions of the flexible, deployable structure include determining at least a twist of the flexible deployable, deployable structure, a symmetry of the flexible deployable, deployable structure, a creep recovery of the flexible deployable, deployable structure, an axial response of the flexible deployable, deployable structure, or a transverse response of the flexible deployable, deployable structure utilizing the determined one or more conditions of the one or more optical fibers.

In some embodiments, the flexible, deployable boom includes a slit-tube boom. In some embodiments, the flexible, deployable structure includes a high strain composite material. In some embodiments, the one or more optical fibers coupled with the flexible, deployable structure include at least one optical fiber adhered to a surface of the flexible, deployable structure. In some embodiments, the one or more optical fibers coupled with the flexible, deployable structure include at least one optical fiber embedded between two or more layers of the flexible, deployable structure. In some embodiments, the one or more optical fibers include one or more fiber optic sensors. In some embodiments, the one or more optical fibers include at least two fiber optic sensors.

Some embodiments include transmitting data over at least one of the one or more optical fibers from one or more components coupled with the flexible, deployable structure.

In some embodiments, the flexible, deployable structure includes at least a lenticular boom, a triangular rollable and collapsible boom, a hinge, or a tape spring. In some embodiments, the one or more optical fibers run axially with respect to the flexible, deployable structure. In some embodiments, the one or more optical fibers run at least in circumferential path or in a serpentine path with respect to the flexible, deployable structure.

Some embodiments include a method that may include coupling one or more optical fibers with a flexible, deployable structure. Coupling the one or more optical fibers with the flexible, deployable structure may include adhering the one or more optical fibers with a surface of the flexible, deployable structure. Coupling the one or more optical fibers with the flexible, deployable structure may include embedding the one or more optical fibers between two or more layers of the flexible, deployable structure. In some embodiments, the flexible, deployable structure includes a high strain composite structure. The high strain composite structure may include a slit-tube boom. The one or more optical fibers may include one or more fiber optical sensors.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 shows a flow diagram of a method in accordance with various embodiments.

DETAILED DESCRIPTION

Figure 1A:
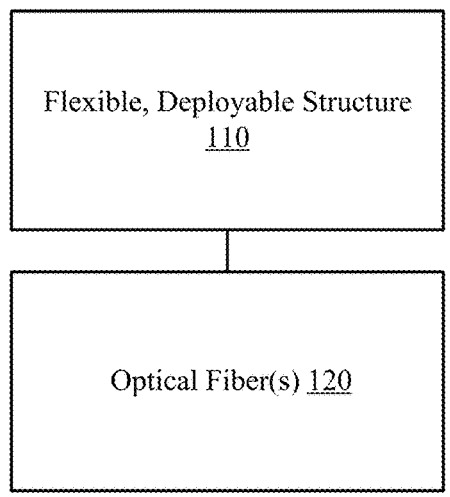
FIG. 1A shows a system in accordance with various embodiments.

This description provides embodiments, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Methods, systems, and devices for flexible, deployable structure with optical fiber are provided in accordance with various embodiments. For example, some embodiments include a system that may include a deployable boom and one or more optical fibers coupled with the deployable boom. The deployable boom may include a slit-tube boom, for example. In some embodiments, the deployable boom includes a high strain composite material. In some embodiments, the one or more optical fibers may be utilized to determine a variety of boom conditions, such as an extent of deployment, based on one or more conditions of the one or more optical fibers. In some embodiments, the one or more optical fibers may be utilized to transmit data from a component coupled the deployable boom.

Some embodiments may include self-deployable composite booms that may use high definition fiber optic sensing. For example, reconfigurable and self-deployable composite booms may provide many advantages when used as the main structure for antennas, sun shields, or solar arrays on satellites. In addition to being very stiff and lightweight, these structures may be efficiently packaged or collapsed into a small form factor due to the material's high strain capability, which may reduce the volume needed to transport them into space. Once in place, these structures may then be activated for deployment. Depending on the spacecraft's orbit, for example, significant thermal gradients may arise on the deployed boom, which may cause thermal deformations.

High-definition fiber optic sensing (HD-FOS) may be utilized, for example, to better understand the behavior of the underlying composite structure. The use of HD-FOS may be utilized as a means of identifying when and to what percent a collapsible composite boom has fully deployed and how it responds to operational and localized thermal loads, for example.

In some embodiments, a single fiber optic sensor is adhered to the surface of a high-strain composite slit-tube boom. Some embodiments may utilize techniques for the change in the strain on the surface of the composite boom, based on the strain of the fiber optic sensor, as a means of determining the extent to which the boom had deployed. For example, when rolled up in packaged form, the composite boom may be under approximately 7000-8000 microstrain in the spanwise direction. The ability of HD-FOS to provide a strain measurement every 1.2 mm along its length, for example, may enable the extension of the boom to be determined by monitoring the transition between a high and low strain state. In addition, some embodiments may provide for measuring the deployed structure's response to loading. Some embodiments may enable another level of deployment control and may provide on-orbit structural information, which may promote more precise control in dynamic environments and may even encourage structural adaptivity.

Some embodiments may include additional optic sensors coupled with the boom that may allow for an improved understanding of the deployed shape including twist, symmetry, creep recovery and even elements of the transverse response, which may not be achievable in current systems. Multiple sensors may also contribute to achieving a more exact beginning and end of the high-to-low strain transition region and may more accurately measure the responses to realistic thermal loads where one side of the boom may be hot and the other may be cold. Real-time sensing of high-strain composite materials with fiber optic sensors may provide a novel and/or superior way to understand operational loads compared to other methods in use today.

As noted above, reconfigurable and self-deployable composite booms are generally stiff and light weight and may be efficiently collapsed into a small form factor due to the material's high strain capability. Once in place, these structures may then be activated for deployment. Depending on the spacecraft's orbit, significant thermal gradients can arise on the deployed boom causing thermal deformations. Some embodiments make use of high-definition fiber optic sensing (HD-FOS) as a means of identifying when and to what extent a collapsible composite boom has fully deployed and how it may respond to localized thermal loads. Some embodiments may enable another level of deployment control and may provide on-orbit structural information to promote more precise control in dynamic environments and even encourage structural adaptivity.

Some embodiments may utilize thin laminates of fiber reinforced plastics that may generally be capable of achieving very large flexural strains and have been successfully implemented in hundreds of aerospace mechanisms including deployable structures for solar sails, de-orbiting devices, and furlable antennas among others. For example, slit-tube boom structures may be capable of being flattened (radially) and then furled along its span, resulting in highly efficient packaging for long booms. The constituent materials, ply fiber orientations, and stacking sequences may be optimized to control the deployed stiffness, furling diameter, stored strain, and coefficient of thermal expansion (CTE). Use of high-modulus carbon fibers in the spanwise direction may for example yield near-zero (axial) CTE, a highly attractive aspect for deployable space structures.

Some embodiments may address different challenges for slit-tube booms such as deployed tip precision. Composite slit-tube booms may commonly experience viscoelastic creep while stowed at high transverse and axial strains (curvatures) before their eventual deployment. The deployment duration may range from milliseconds to minutes, can occur within a wide range of temperatures (e.g., −40° C. to 100° C.), and may be self-controlled via stored energy or controlled by mechanisms. The operational design loads on the structure may make it difficult to predict the deployed tip precision immediately after deployment and after long-duration creep recovery and on-orbit thermal cycles. Therefore, rigorous qualification tests may be performed both at the coupon-scale to determine creep/recovery responses for example, and at the system level to measure deployed stiffness and precision during operation. Combinations of measurement techniques may include strain gages, digital speckle correlation, load cells, and photogrammetry that may often be implemented to monitor these factors. However, strain gauges are generally not continuous and digital speckle correlation and photogrammetry systems are generally difficult to use for structures with large displacements and dynamic deployments such as slit-tube booms.

In an effort to understand the deployment characteristics and thermal response of a composite slit-tube boom, some embodiments are configured with a fiber optic sensor incorporated with the structure. This method generally results in strain and temperature measurements along a continuous optical fiber sensor that may be up to 50 m long, at a millimeter-scale spatial resolution. Optical fiber sensors are generally small, lightweight, flexible, and minimally invasive. Other properties of optical fiber, such as immunity to radio-frequency interference (RFI) and electromagnetic interference (EMI) as well as excellent fatigue performance, may make it an attractive lifetime measurement tool.

Some embodiments include a single fiber optic sensor that may be adhered to the inner surface of a high-strain composite slit-tube boom. Some embodiments may utilize the change in the strain on the surface of the composite boom, based on strain measurements of the optic sensors, as a means of determining the extent to which the boom had deployed. Some embodiments may provide a means to measure the structure's response to localized thermal loading. HD-FOS measurements, which may provide a means to be a highly effective and accurate method for qualification testing of deployable booms.

Turning now to FIG. 1A, a system 100 is provided in accordance with various embodiments. System 100 may also be referred to as a device. System 100 may include a flexible, deployable structure 110 and one or more optical fibers 120 coupled with the flexible, deployable structure 110. In some embodiments, the flexible, deployable structure 110 includes a slit-tube boom. The flexible, deployable structure 110 may include a high strain composite material. In some embodiments, the flexible, deployable structure 110 includes at least a lenticular boom, a triangular rollable and collapsible boom, a hinge, or a tape spring.

In some embodiments, the one or more optical fibers 120 coupled with the flexible, deployable structure 110 include at least one optical fiber adhered to a surface of the flexible, deployable structure 110. In some embodiments, the one or more optical fibers 120 coupled with the flexible, deployable structure 110 include at least one optical fiber embedded between two or more layers of the flexible, deployable structure 110.

In some embodiments, the one or more optical fibers 120 include one or more fiber optic sensors. The one or more fiber optic sensors, or more generally the one or more optical fibers 120, may be configured to facilitate determining an extent of deployment of the flexible, deployable structure 110. Determining the extent of deployment of the flexible, deployable structure 110 may include determining a change in strain of the one or more fiber optic sensors. In some embodiments, the one or more optical fibers 120 include at least two fiber optic sensors. In general, one or more conditions of the one or more optical fibers 120 coupled with a flexible, deployable structure 110 may be determined, which may then be utilized to determine one or more conditions of the flexible, deployable structure 110 utilizing the determined one or more conditions of the one or more optical fibers 120 coupled with the flexible, deployable structure 110. For example, a change in strain of the one or more optical fibers 120 may be correlated to a change in physical strain of the flexible, deployable structure 110. In general, the one or more conditions of the one or more optical fibers 120 may be correlated to the one or more conditions of the flexible, deployable structure 110.

In some embodiments, the one or more fiber optic sensors are configured to facilitate determining a deployed shape of the flexible, deployable structure 110. Determining the deployed shape of the flexible, deployable structure 110 may include determining at least a twist of the flexible, deployable structure 110, a symmetry of the flexible, deployable structure 110, a creep recovery of the flexible, deployable structure 110, an axial response of the flexible, deployable structure 110, or a transverse response of the flexible, deployable structure 110.

In some embodiments, the one or more fiber optic sensors are configured to facilitate determining a temperature of the flexible, deployable structure 110. In some embodiments, the one or more optical fibers 120 include one or more optical fibers 120 configured for data transmission from one or more components coupled with the flexible, deployable structure 110. Some embodiments include the one or more components coupled with the flexible, deployable structure 110 such that one or more optical fibers 120 configured for data transmission transmit data from the one or more components.

In some embodiments, the one or more optical fibers 120 run axially with respect to the flexible, deployable structure 110. In some embodiments, the one or more optical fibers 120 run at least in a circumferential path or in a serpentine path with respect to the flexible, deployable structure 110. In some embodiments, at least one of the at least two fiber optic sensors is utilized at least for redundancy or for improved precision. Some embodiments include one or more light sources coupled with the one or more optical fibers 120 and one or more receivers configured to receive light from the one or more optical fibers 120.

Figure 1B:
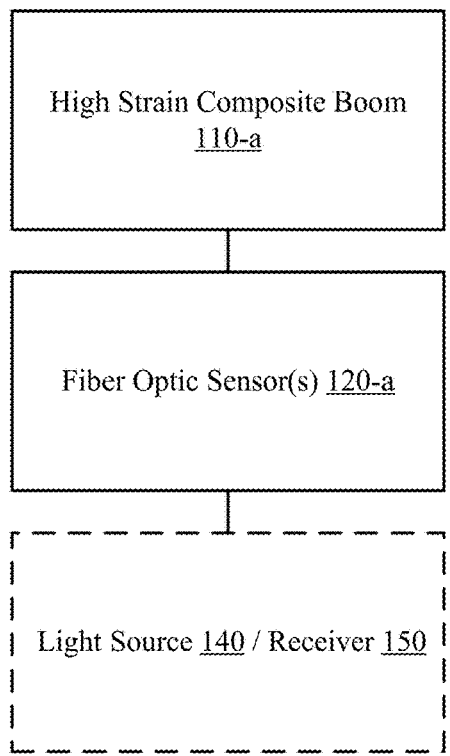
FIG. 1B show a system in accordance with various embodiments.

FIG. 1B shows an example of a system 100-*a* in accordance with various embodiments, which may be an example of system 100 of FIG. 1A for example. In particular, system 100-*a* may include a high-strain composite boom 110-*a* coupled with one or more fiber optic sensors 120-*a*. In some embodiments, the high-strain composite boom 110-*a* may include a slit-tube boom, though other boom types may be utilized, including, but not limited to, a lenticular boom, a triangular rollable and collapsible boom, a hinge, or a tape spring.

The one or more fiber optic sensors 120-*a* may be configured to facilitate determining an extent of deployment of the high-strain composite boom 110-*a*. Determining the extent of deployment of the high strain composite boom 110-*a* utilizing the one or more fiber optic sensors 120-*a* may include determining a change in strain of fiber optic sensors 120-*a*. In general, one or more conditions of one or more fiber optic sensors 120-*a* coupled with a high-strain composite boom 110-*a* may be determined. One or more conditions of the high-strain composite boom 110-*a* may be determined utilizing the determined one or more conditions of the one or more fiber optic sensors 120-*a* coupled with the high-strain composite boom 110-*a*. Some embodiments may include one or more light sources 140 and/or one or more receivers 150, which may facilitate these determinations. In general, the one or more conditions of the one or more fiber optical sensors 120-*a* may be correlated to the one or more conditions of the high-strain composite boom 110-*a*.

For example, some embodiments may utilize optical frequency domain reflectometry (OFDR), which may generally allow thousands of sensing points along a single optical fiber, such as the one or more fiber optic sensors 120-*a*, to be read with sub-millimeter spatial resolution. When scanned by the light source 140, such as a tunable laser light source, the Rayleigh backscatter of an optical fiber generally produces a random but repeatable spectral pattern unique to each fiber length. This may be recorded by the receiver 140, such as an interrogator and compared with each scan.

As with a fiber Bragg grating (FBG), localized temperature change or strain may shift the reflected spectrum of the scatter in the fiber at that location. The shift in reflected spectrum may be calculated by performing a cross-correlation of the scatter spectrum of a measurement data set with that of a reference data set taken from the same fiber sensor in a known, nominal temperature or strain state. A correlation peak may be shifted from center by a wavelength or frequency shift resulting from the strain, for example. This shift may then be converted to measured strain using known calibration coefficients appropriate to the fiber type.

For a spatially distributed measurement, this cross correlation calculation may be carried out at numerous points along the length of the fiber sensor. The gage length that defines each measurement point is typically on the order of a millimeter but can be larger or smaller, and the average spectral shift for each gage length may be determined. Using this procedure, detailed profiles of strain or temperature versus distance may be found along the entire length of the fiber sensor, which may be utilized as an indicator of different conditions of the boom 110-*a* to which the fiber sensor 120-*a* is coupled.

In some embodiments of system 100-*a*, the one or more fiber optic sensors 120-*a* include at least two fiber optic sensors. The one or more fiber optic sensors 120-*a* may be configured to facilitate determining a deployed shape of the high-strain composite boom 110-*a*. Determining the deployed shape of the high-strain composite boom 110-*a* utilizing the one or more fiber optic sensors 120-*a* may include determining at least a twist, a symmetry, a creep recovery, or an element of a transverse response of the high-strain composite boom 110-*a*. In some embodiments of system 100-*a*, the one or more fiber optic sensors 120-*a* are configured to facilitate determining a temperature of the high-strain composite boom 110-*a*.

Figure 1C:
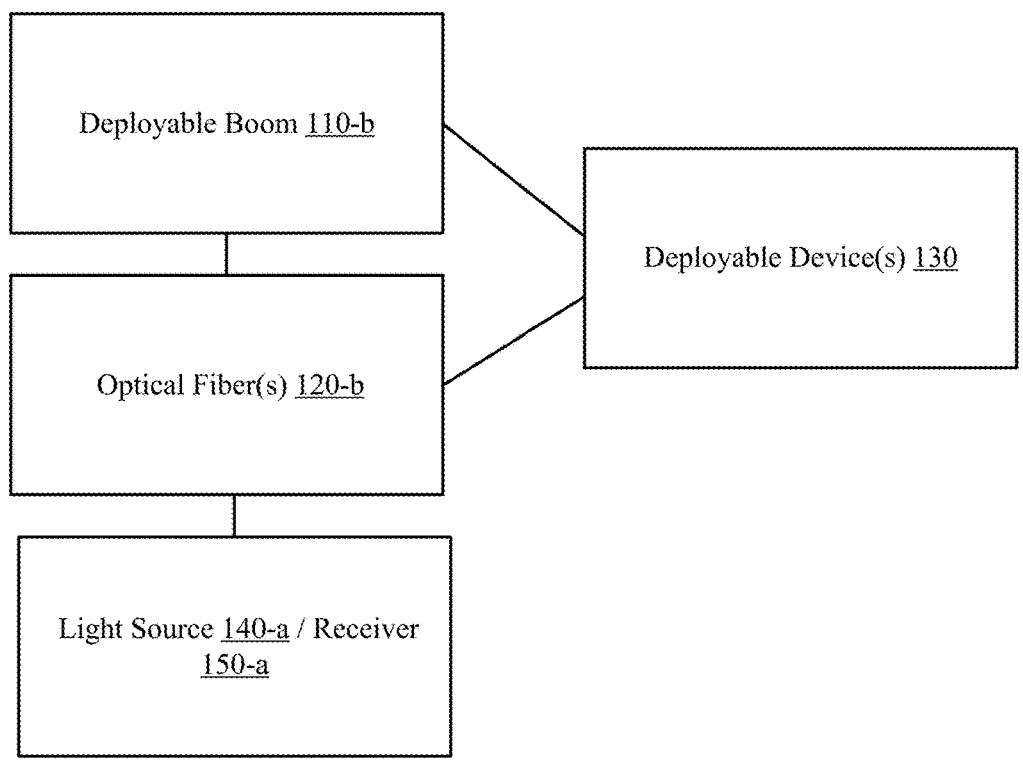
FIG. 1C show a system in accordance with various embodiments.

FIG. 1C shows an example of a system 100-*b* in accordance with various embodiments, which may be an example of system 100 of FIG. 1A and/or system 100-*a* of FIG. 1B. In particular, system 100-*b* may include deployable boom 110-*b* coupled with one or more optical fibers 120-*b*. In some embodiments, one or more of the one or more optical fibers 120-*b* may be configured for data transmission from one or more components, which may be referred to as deployable devices 130, coupled with the deployable boom 110-*b*. Some embodiments include the one or more deployable devices 130 coupled with the deployable boom 110-*b* such that one or more optical fibers 120-*b* are configured for data transmission transmit data from the one or more components 130.

System 100-*b* may include one or more light sources 140-*a* and one or more receivers 150-*a*. The one or more light sources 140-*a* may be coupled with the one or more optical fibers 120-*b*. The one or more receivers 150-*a* may be configured to receive light from the one or more optical fibers 120-*b*. The light received may be utilized to determine a variety of conditions of the deployable boom 110-*b* based on one or more conditions of the one or more optical fibers 120-*b*. The one or more light sources 140-*a* may include one or more laser light sources.

Figure 2A:
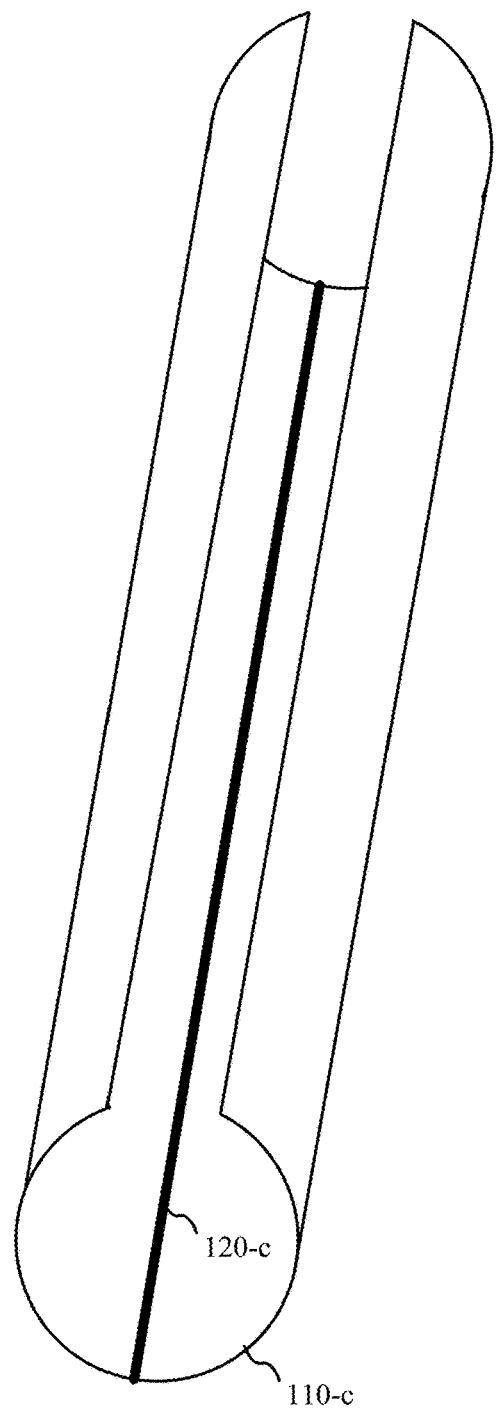
FIG. 2A shows a system in accordance with various embodiments.
Figure 2B:
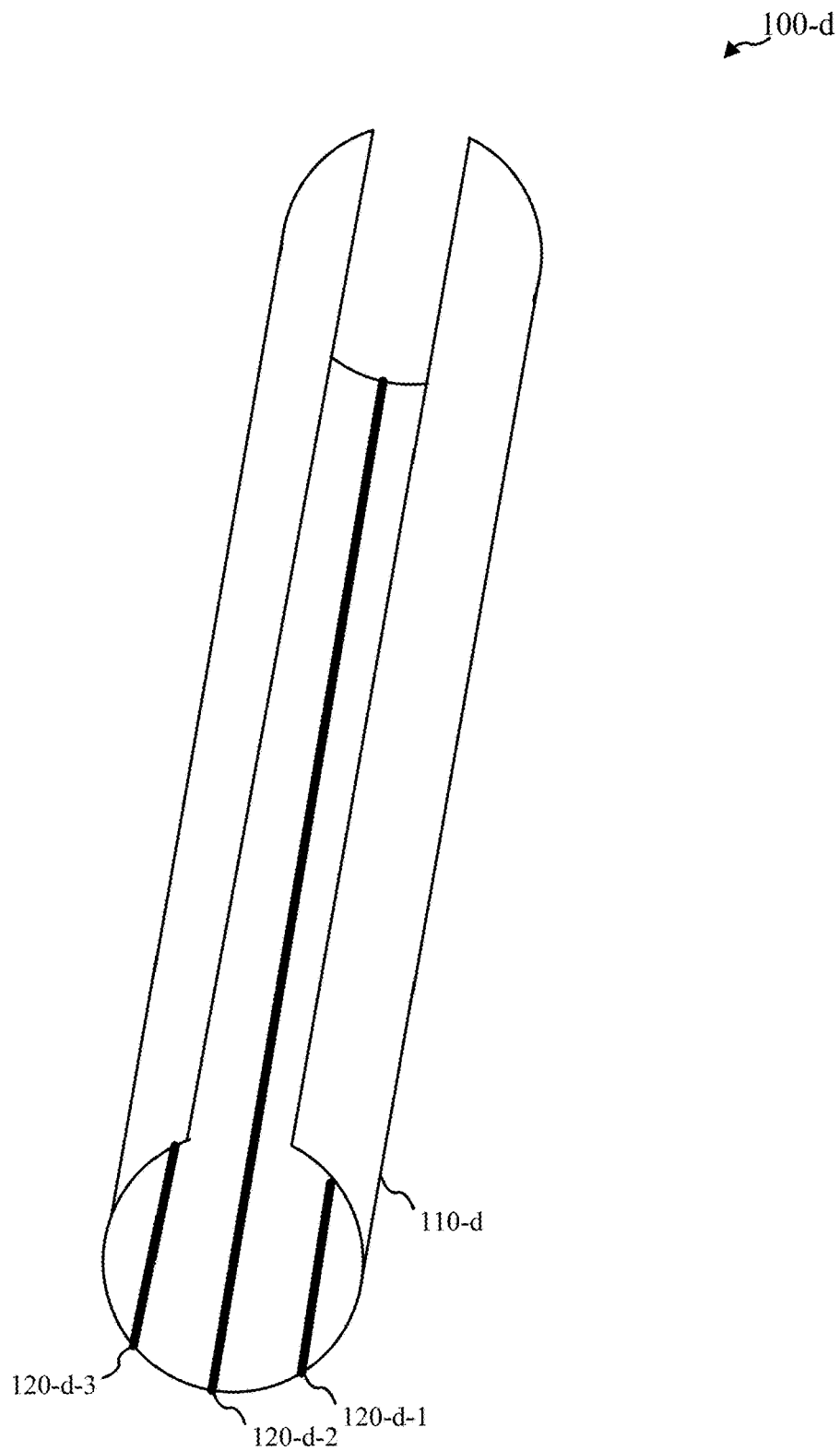
FIG. 2B shows a system in accordance with various embodiments.
Figure 2C:
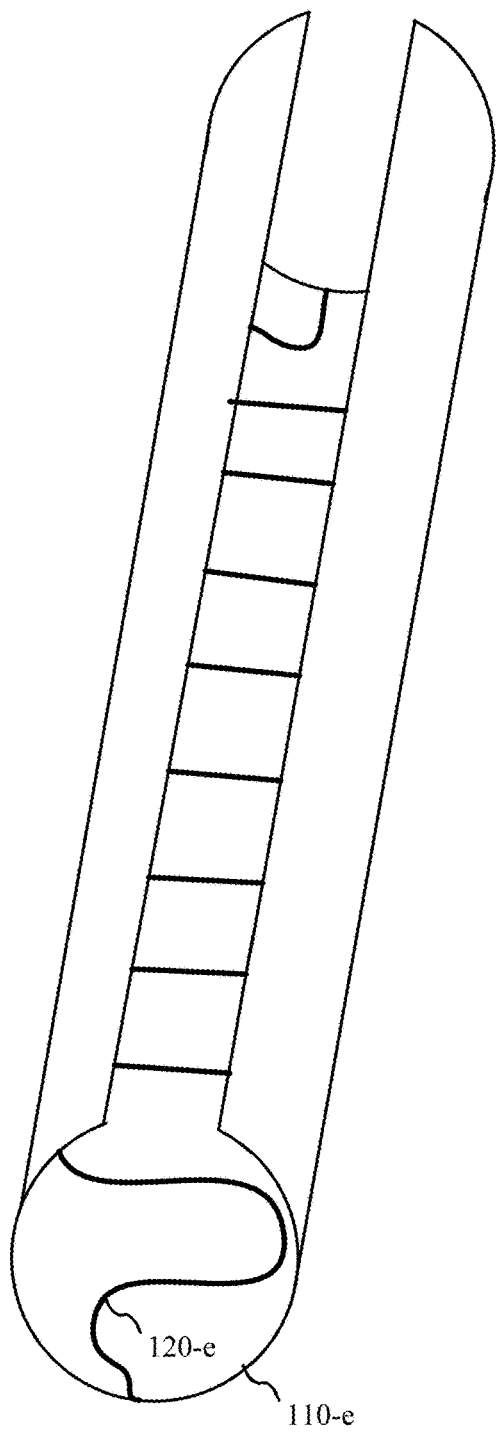
FIG. 2C shows a system in accordance with various embodiments.

Turning now to FIG. 2A, a system 100-*c* in accordance with various embodiments is provided. System 100-*c* may include a deployable boom 110-*c* that may be configured as a slit-tube boom with one or more optical fibers 120-*c* coupled with the slit-tube boom. FIG. 2B may then show a similar system 100-*d* with a slit-tube boom 110-*d* with multiple optical fibers 120-*d*-1, 120-*d*-2, 120-*d*-3. In both system 100-*c* and 100-*d*, the optical fibers 120-*c* and/or 120-*d*-1, 120-*d*-2, 120-*d*-3 may run axially with respect to a boom length of the respective slit-tube booms 110-*c* or 120-*d*. FIG. 2C may show another system 100-*e* with a slit-tube boom 110-*e* with one or more optical fibers 120-*e* that may run along a serpentine path (or circumferentially) with respect to a boom length of the slit-tube boom 110-*e*; other path shapes may be utilized, such as a down-and-back u-shaped path. Systems 100-*c*, 100-*d*, and 100-*e* may be examples of aspects of system 100 of FIG. 1A, system 100-*a* of FIG. 1B, and/or system 100-*b* of FIG. 1C.

Figure 2D:
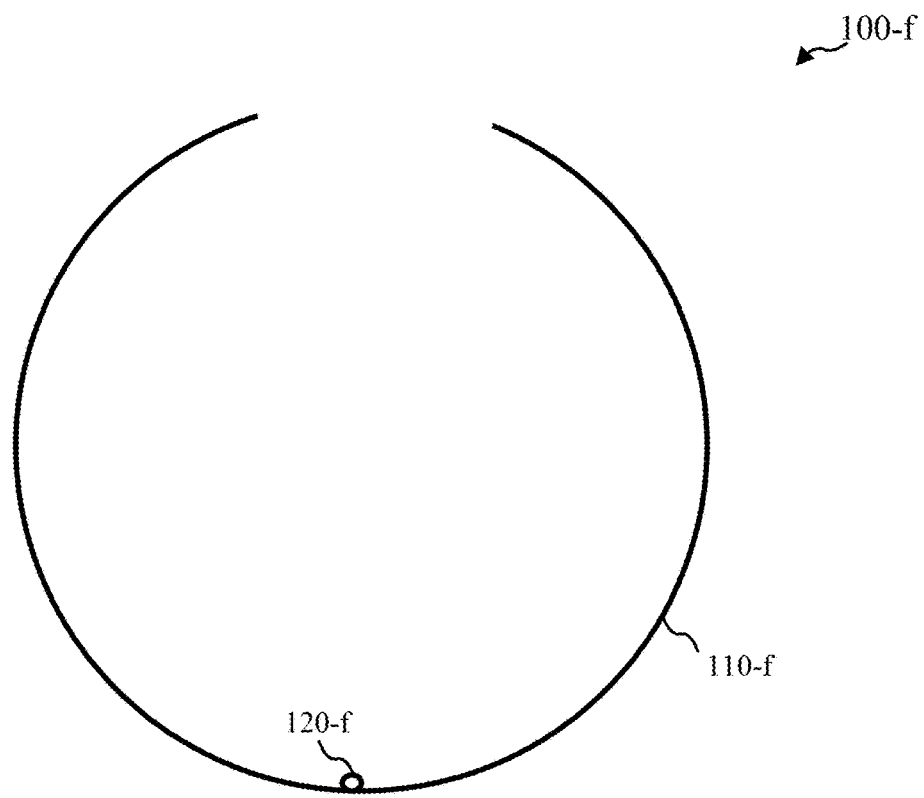
FIG. 2D shows aspects of a system in accordance with various embodiments.
Figure 2E:
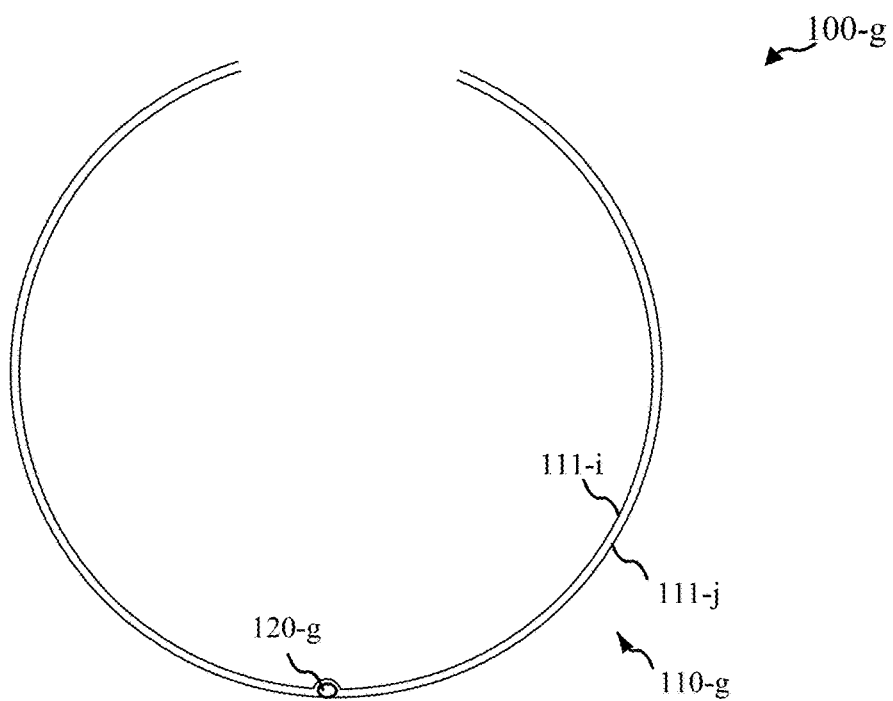
FIG. 2E shows aspects of a system in accordance with various embodiments.

FIG. 2D shows a cross-sectional view of a system 100-*f* in accordance with various embodiments. In particular, system 100-*f* may show an example where one or more optical fibers 120-*f* may be adhered to a surface of a deployable boom 110-*f*, such as a slit-tube boom. Some embodiments may embed the one or more optical fibers, such as may be seen in the cross-section view of FIG. 2E, where one or more optical fibers 120-*g* may be embedded between two layers 111-*i* and 111-*j* of deployable boom 110-*g*; in some embodiments, the deployable boom 110-*g* may be formed as a composite with multiple layers. Systems 100-*f* and 100-*g* may be examples of aspects of system 100 of FIG. 1A, system 100-*a* of FIG. 1B, system 100-*b* of FIG. 1C, system 100-*c* of FIG. 2A, system 100-*d* of FIG. 2B, and/or system 100-*e* of FIG. 2C.

Figure 2F:
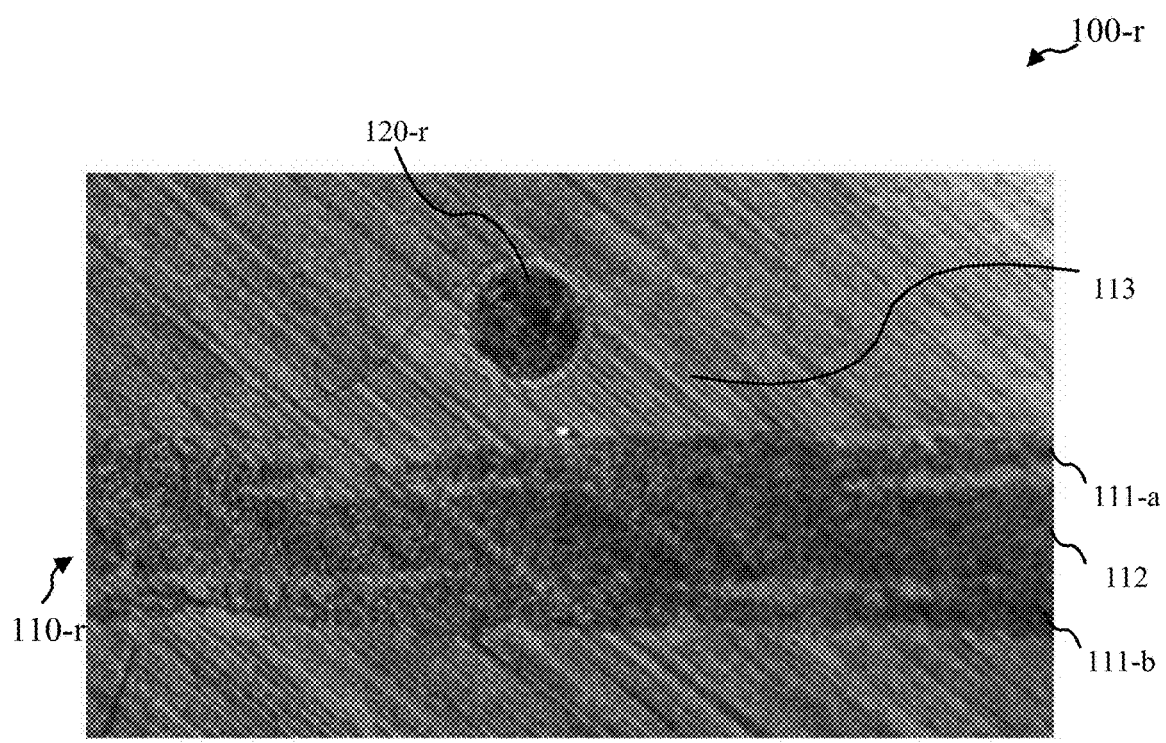
FIG. 2F shows aspects of a system in accordance with various embodiments.

Turning now to FIG. 2F, a micro-sectioning of a system 100-*r* in accordance with various embodiments is provided. System 100-*r* may be an example of aspects of system 100 of FIG. 1A, system 100-*a* of FIG. 1B, system 100-*b* of FIG. 1C, system 100-*c* of FIG. 2A, system 100-*d* of FIG. 2B, system 100-*e* of FIG. 2E, and/or system 100-*f* of FIG. 2D, for example. In this example, slit-tube boom 110-*r* was fabricated to a 50 mm length, a 28.56 mm inner diameter, a thickness of 0.224 mm, and a slit opening of 16°. The slit-tube boom 110-*r* was composed of the composite layup: $[+45_g/0_c/0_c/+45_g]$, where the 'g' and 'c' subscripts refer to plain-weave 3070 e-glass 111-*a*, 111-*b* and unidirectional IM7 carbon fiber plies 112 respectively. FIG. 2F shows a single 1-meter fiber optic strain sensor 120-*r* bonded to the centreline of the boom 110-*r* using MBond 200 cyanoacrylate adhesive 113. The fiber diameter is approximately 0.165 mm and the thickness of the bond at this cross-sectional location was measured to be approximately 0.054 mm (the distance between the bottom sensor 120-*r* and the top of e-glass layer 111-*a*). The micro-section may also allow for determination of the cured e-glass and carbon ply thicknesses combined thickness (approximately 0.224 mm, with the total carbon plies thickness of approximately 0.091 mm) as well as the distance from the local bending mid-plane to the HD-FOS center.

Except for regions near the bonded sensor, the furling mid-plane (where axial strain equaled zero) was located at the laminate mid-plane. Due to the thickness of the sensor 120-*r* and adhesive 113, the (local) bending plane was generally shifted towards the sensor 120-*r*. At this cross-ssectional location, the distance of the sensor center from the laminate surface was 0.139 mm. In some embodiments, the fiber sensor 120-*r* may rest directly on the laminate surface, encapsulated by adhesive 113, which may in negligible bond thickness bond thickness. The dimensions are merely provided as examples; other embodiments may utilize other dimensions.

One may note in general that the thickness of the sensors 120 may be on the same order as that of the flexible, deployable structures 110. As a result, a measurement of strain within the sensors 120 may not necessarily be the same as that experienced by the flexible, deployable structures 110. As such, some embodiments may include new, inventive uses of sensors 120 through providing one or more correlations with conditions of the flexible, deployable structures 110, such as deployment state, shape, etc.

Figure 2G:
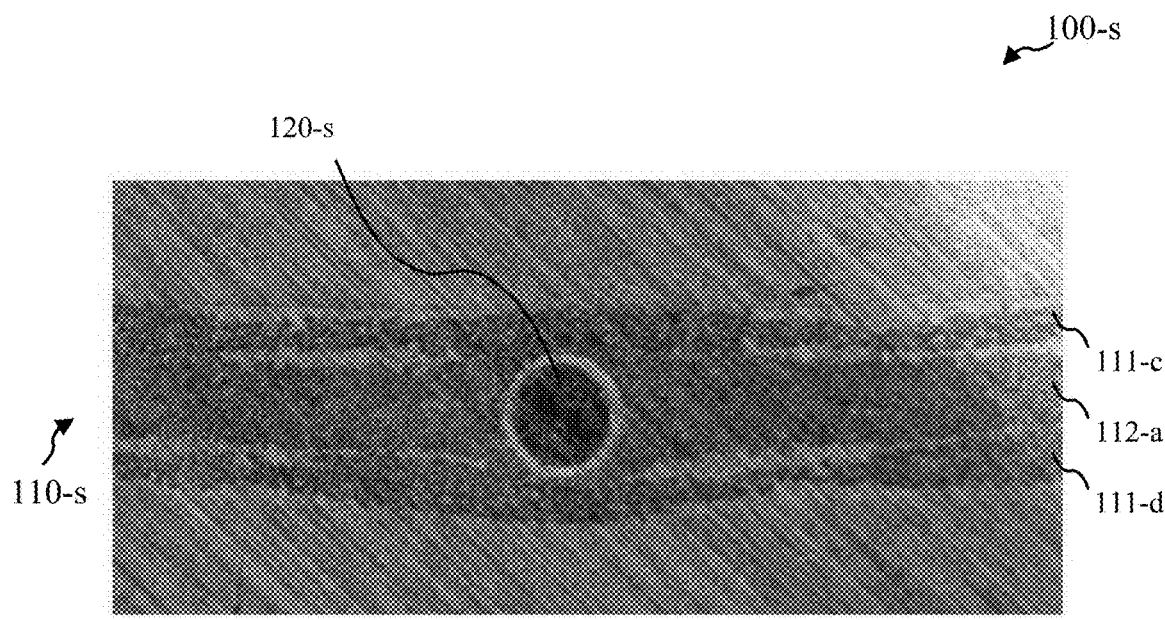
FIG. 2G shows aspects of a system in accordance with various embodiments.

FIG. 2G shows another micro-sectioning view of aspects of a system 100-*s* where the optical fiber 120-*s* may be embedded between layers of the high-strain composite material. As may be shown, a fiber optic sensor 120-*s* may be embedded between carbon fiber plies 112-*a*, with outer layers of e-glass 111-*c*, 110-*d*, that form the high-strain composite structure 110-*r*. System 100-*s* may involve similar dimensions as system 100-*r*, though the dimensions are merely provided as examples; other embodiments may utilize other dimensions. Systems 100-*s* may be an example of aspects of system 100 of FIG. 1A, system 100-*a* of FIG. 1B, system 100-*b* of FIG. 1C, system 100-*c* of FIG. 2A, system 100-*d* of FIG. 2B, system 100-*e* of FIG. 2C, and/or system 100-*g* of FIG. 2E, for example.

Figures 3A, 3B:
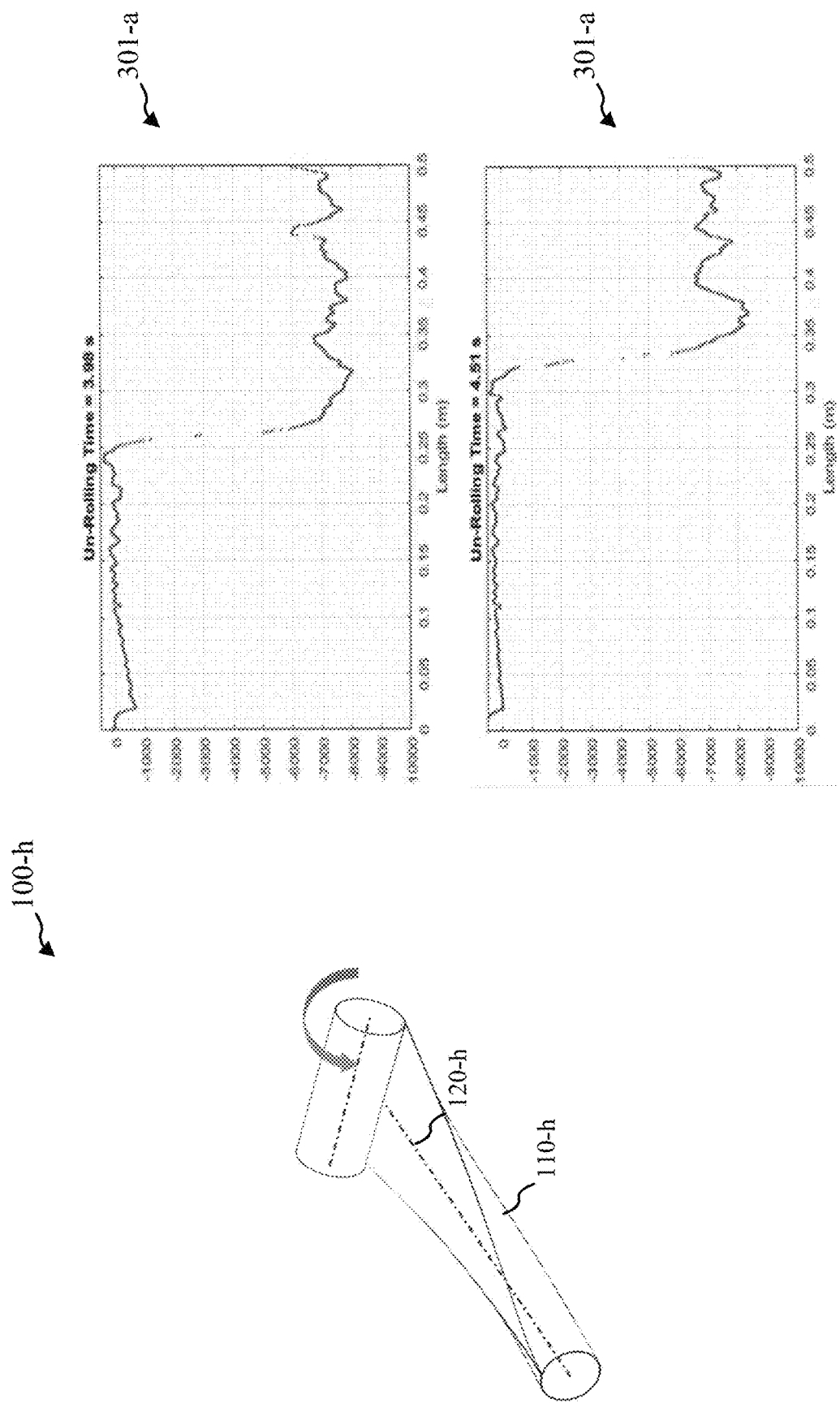
FIG. 3A shows a system in accordance with various embodiments.
FIG. 3B shows graphs related to a system in accordance with various embodiments.
Figure 3C:
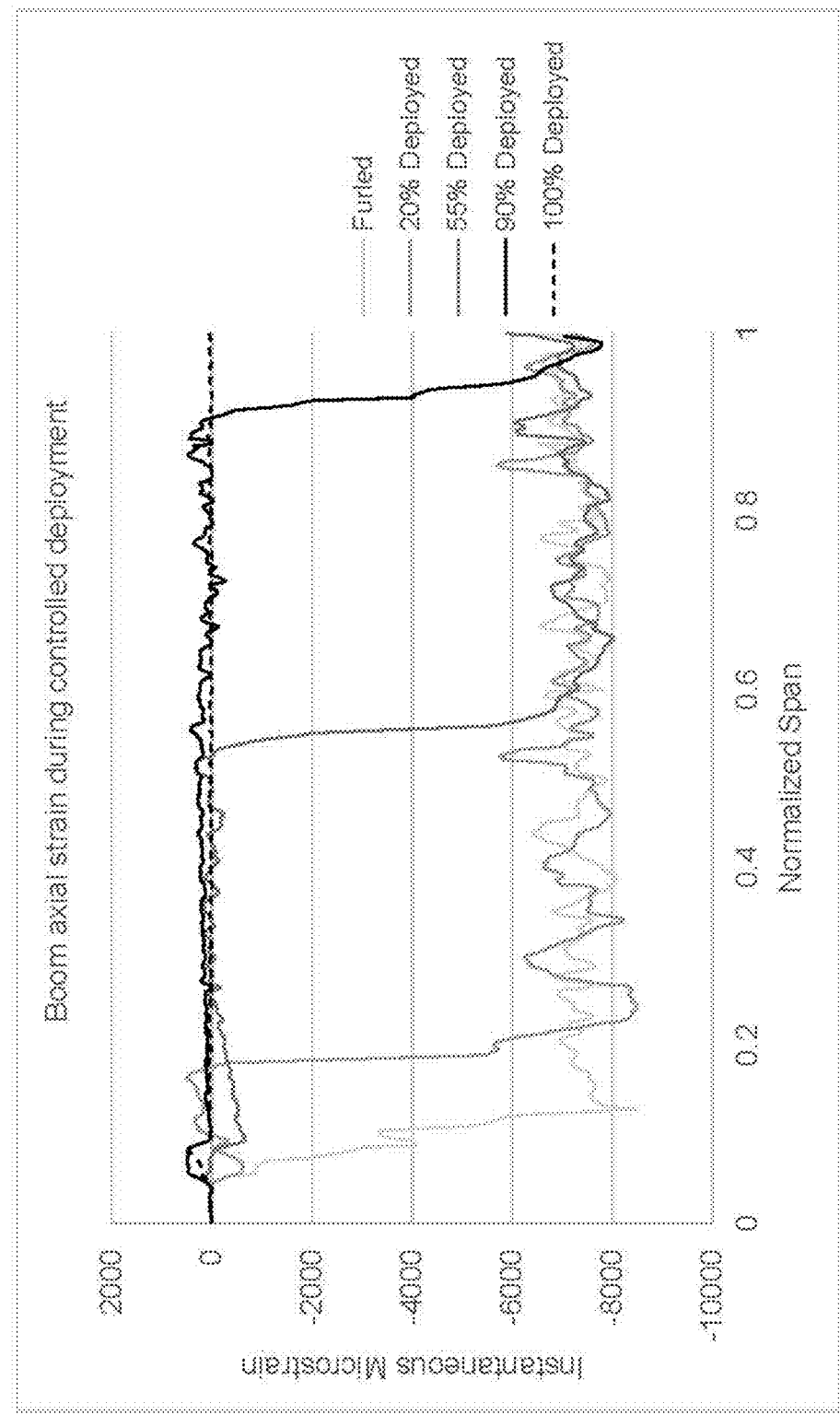
FIG. 3C shows a graph related to a system in accordance with various embodiments.

Turning now to FIG. 3A, a system 100-*h* in accordance with various embodiments is provided. System 100-*h* may include a flexible, deployable boom 110-*h* coupled with one or more optical fibers 120-*h*. Deployable boom 110-*h* may be shown as a slit-tube boom formed from a high-strain composite in a partially deployed state. Systems 100-*h* may be an example of aspects of system 100 of FIG. 1A, system 100-*a* of FIG. 1B, system 100-*b* of FIG. 1C, and/or system 100-*c* of FIG. 2A, for example. FIG. 3B may show graphs 301-*a* and 301-*b* of static representation of the sensor strain vs deployment boom length during two stages of deployment, which may correspond to the state of deployment of system 100-*h* of FIG. 3A. FIG. 3C may show then a graph 301-*c* of a static representation of the sensor strain vs deployment normalized boom length during various stages of deployment from a furled state to a fully deployed states.

As may be shown in FIG. 3B and/or FIG. 3C, high spatial resolution and continuous spanwise strain measurements may result in the ability to observe the location where a steep drop in sensor strain (from approximately 0 to approximately −7500 microstrain) may occur over a short span length. This may indicate the transition from the furled and deployed boom shape. Thus, the extent of boom deployment (deployed length) may be determined and/or calculated from the sensor strain. The relationship between sensor strain and deployment boom length as shown in these graphs may be determined from over several controlled furling and deployment cycles while monitoring the strain readout from the sensor. These examples may provide embodiments where one or more conditions, such as strain, of the optical fiber 110-*h* may be correlated to the one or more conditions, such as extent of deployment, of the boom 110-*h*.

Figure 3D:
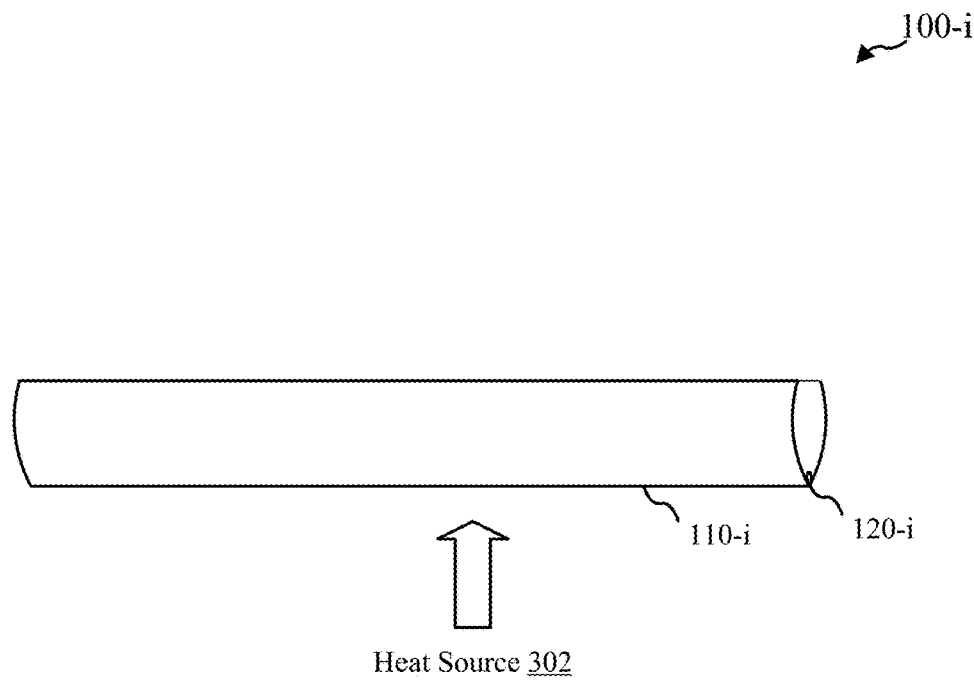
FIG. 3D shows a system in accordance with various embodiments.
Figure 3E:
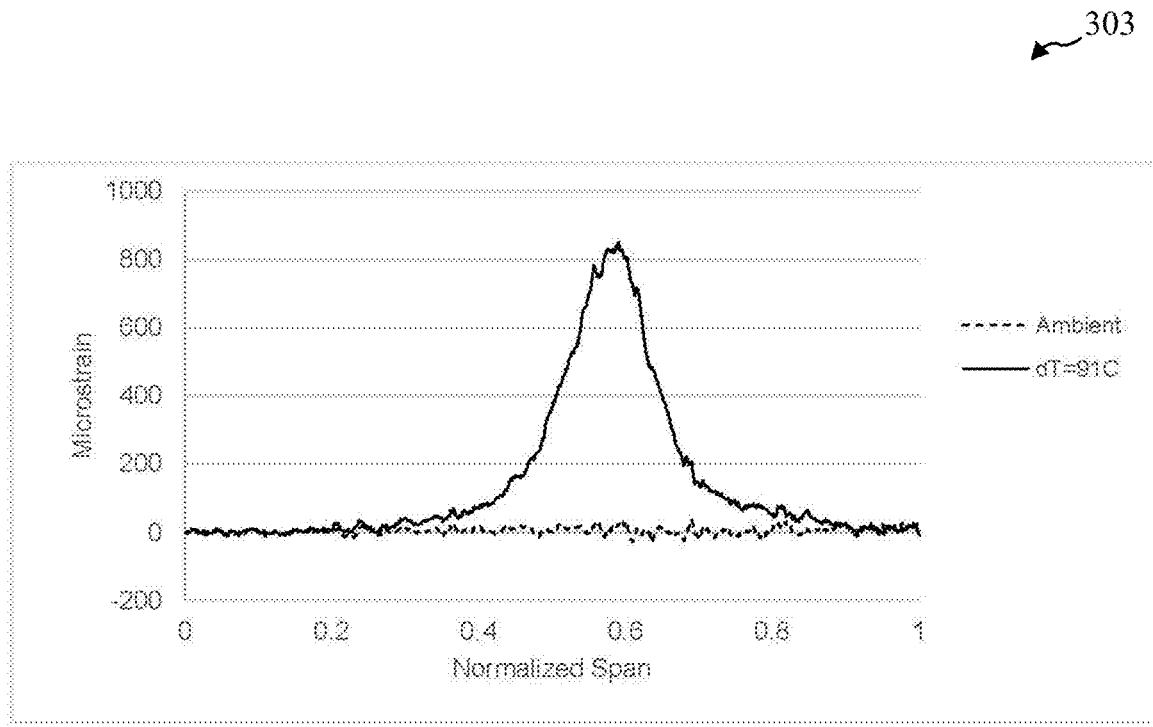
FIG. 3E shows a graph related to a system in accordance with various embodiments.

Turning now to FIG. 3D, an example of a system 100-*i* may be shown with heat being applied from a heat source 302 at a localized portion of system 100-*i*, where the system 100-*i* includes a slit-tube boom 110-*i* and an optical fiber 120-*i* coupled with it. FIG. 3E may then show the resulting microstrain measured with respect to the optical fiber 120-*i* with respect to its normalized span. In this particular example, a nearby thermocouple may be utilized to measure the associated temperature or temperature change to correlate the microstrain of the optical fiber with respect to its normalized span to determine a localized temperature or temperature change for the slit tube-boom 110-*i*. This example may provide an embodiment where one or more conditions, such as strain, of the optical fiber 110-*i* may be correlated to the one or more conditions, such as localized temperature, of the boom 110-*i*. The system 100-*i* may be an example of aspects of system 100 of FIG. 1A, system 100-*a* of FIG. 1B, system 100-*b* of FIG. 1C, and/or system 100-*c* of FIG. 2A, for example.

Figure 4:
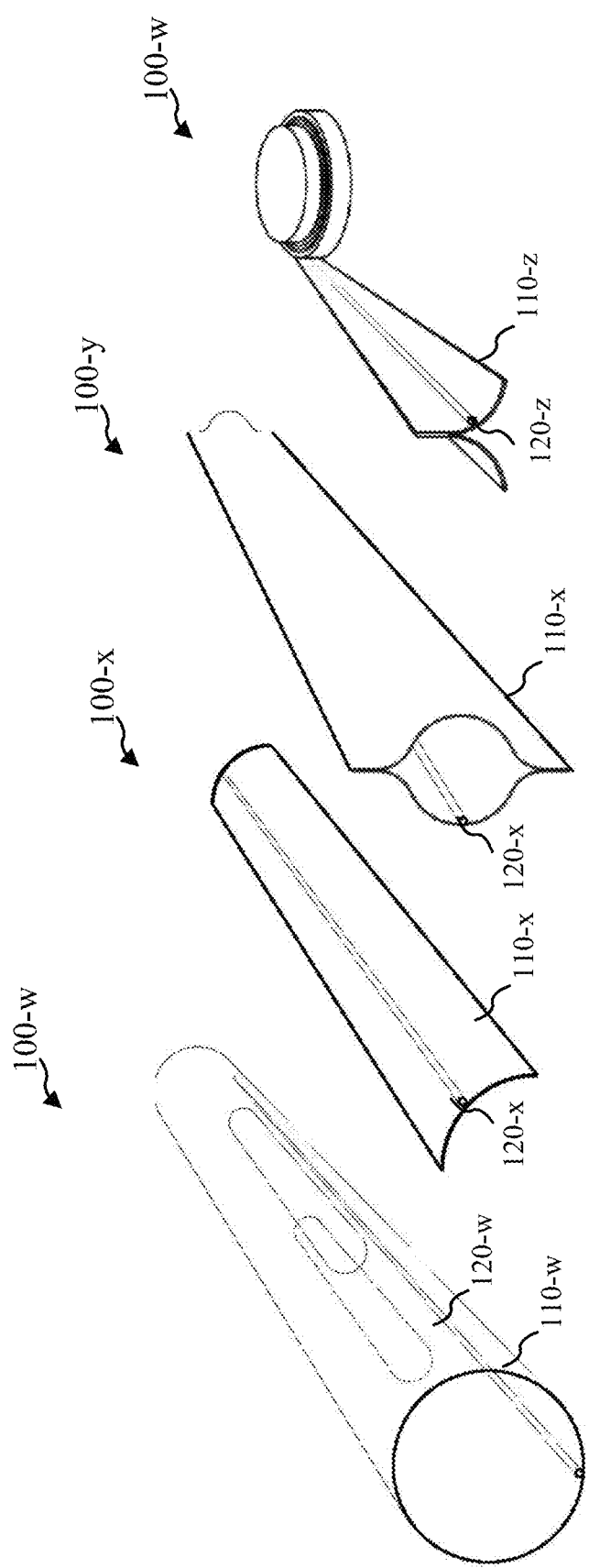
FIG. 4 shows a variety of systems in accordance with various embodiments.

FIG. 4 shows a variety of systems 100-*w*, 100-*x*, 100-*y*, and 100-*z* with flexible, deployable structures 110-*w*, 110-*x*, 110-*y*, and 110-*z* that may be coupled with one or more optical fibers 120-*w*, 120-*x*, 120-*y*, and 120-*z*, respectively. For example, system 100-*w* may show flexible, deployable structure 110-*w* configured with a tube hinge, system 100-*x* may show flexible, deployable structure 110-*x* configured as a tape spring, system 100-*y* may show flexible deployable structure 110-*y* configured as a double-omega boom, and system 100-*z* may show flexible, deployable structure 110-*z* configured as a triangular rollable and collapsible boom. Systems 100-*w*, 100-*x*, 100-*y*, and 100-*z* may be an example of aspects of system 100 of FIG. 1A, system 100-*a* of FIG. 1B, and/or system 100-*b* of FIG. 1C, for example.

Figure 5:
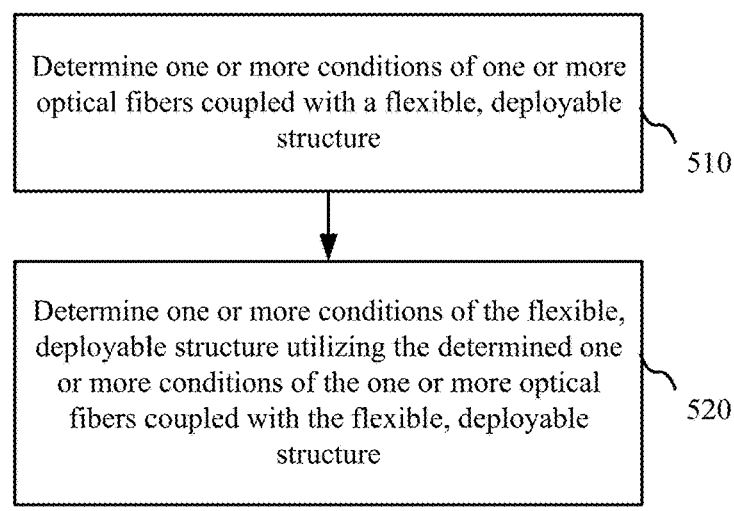
FIG. 5 shows a flow diagram of a method in accordance with various embodiments.

Turning now to FIG. 5, a flow diagram of a method 500 is shown in accordance with various embodiments. Method 500 may be implemented utilizing a variety of systems and/or devices such as those shown and/or described with respect to FIG. 1A, FIG. 1B, FIG. 1C, FIG. 2A, FIG. 2B, FIG. 2C, FIG. 2D, FIG. 2E, FIG. 2F, FIG. 2G, FIG. 3A, FIG. 3B, FIG. 3C, FIG. 3D, FIG. 3E, and/or FIG. 4.

At block 510, one or more conditions of one or more optical fibers coupled with a flexible, deployable structure may be determined. At block 520, one or more conditions of the flexible, deployable structure may be determined utilizing the determined one or more conditions of the one or more optical fibers coupled with the flexible, deployable structure.

In some embodiments of method 500, determining the one or more conditions of the flexible, deployable structure utilizing the determined one or more conditions of the one or more optical fibers coupled with the flexible, deployable structure include determining a change in strain of the one or more optical fibers. For example, the change in strain of the one or more optical fibers may be correlated to a change in physical strain of the flexible, deployable structure. Determining the one or more conditions of the flexible, deployable structure may include determining an extent of deployment of the flexible, deployable structure utilizing the determined change in strain of the one or more optical fibers. In general, the one or more conditions of the one or more optical fibers may be correlated to the one or more conditions of the flexible, deployable structure.

In some embodiments of method 500, determining the one or more conditions of the one or more optical fibers coupled with the flexible, deployable structure include scanning the one or more optical fibers with a light source. Determining the one or more conditions of the one or more optical fibers coupled with the flexible, deployable structure may further include performing a cross-correlation of a reference data set with a reflected spectrum produced from scanning the one or more optical fibers.

In some embodiments of method 500, determining the one or more conditions of the flexible, deployable structure includes determining a temperature of the flexible deployable, deployable structure utilizing the determined one or more conditions of the one or more optical fibers. In some embodiments, determining the one or more conditions of the flexible, deployable structure includes determining a deployed shape of the flexible, deployable structure utilizing the determined one or more conditions of the one or more optical fibers. In some embodiments, determining the one or more conditions of the flexible, deployable structure include determining at least a twist of the flexible deployable, deployable structure, a symmetry of the flexible deployable, deployable structure, a creep recovery of the flexible deployable, deployable structure, an axial response of the flexible deployable, deployable structure, or a transverse response of the flexible deployable, deployable structure utilizing the determined one or more conditions of the one or more optical fibers.

In some embodiments of method 500, the flexible, deployable boom includes a slit-tube boom. In some embodiments, the flexible, deployable structure includes a high strain composite material. In some embodiments, the one or more optical fibers coupled with the flexible, deployable structure include at least one optical fiber adhered to a surface of the flexible, deployable structure. In some embodiments, the one or more optical fibers coupled with the flexible, deployable structure include at least one optical fiber embedded between two or more layers of the flexible, deployable structure. In some embodiments, the one or more optical fibers include one or more fiber optic sensors. In some embodiments, the one or more optical fibers include at least two fiber optic sensors.

Some embodiments of method 500 include transmitting data over at least one of the one or more optical fibers from one or more components coupled with the flexible, deployable structure.

In some embodiments of method 500, the flexible, deployable structure includes at least a lenticular boom, a triangular rollable and collapsible boom, a hinge, or a tape spring. In some embodiments, the one or more optical fibers run axially with respect to the flexible, deployable structure. In some embodiments, the one or more optical fibers run at least in circumferential path or in a serpentine path with respect to the flexible, deployable structure.

Turning now to FIG. 6, a flow diagram of a method 600 is shown in accordance with various embodiments. Method 600 may be implemented utilizing a variety of systems and/or devices such as those shown and/or described with respect to FIG. 1A, FIG. 1B, FIG. 2A, FIG. 2B, FIG. 2C, FIG. 2D, FIG. 2E, FIG. 2F, FIG. 2G, FIG. 3A, FIG. 3B, FIG. 3C, FIG. 3D, FIG. 3E, FIG. 4, and/or FIG. 5.

At block 610, one or more optical fibers may be coupled with a flexible, deployable structure. Coupling the one or more optical fibers with the flexible, deployable structure may include adhering the one or more optical fibers with a surface of the flexible, deployable structure. Coupling the one or more optical fibers with the flexible, deployable structure may include embedding the one or more optical fibers between two or more layers of the flexible, deployable structure. In some embodiments, the flexible, deployable structure includes a high strain composite structure. The high strain composite structure may include a slit-tube boom. The one or more optical fibers may include one or more fiber optical sensors.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A method comprising:
deploying a slit-tube boom from a furled state;
determining one or more conditions of one or more optical fibers coupled with the slit-tube boom during deployment of the slit-tube boom, wherein the one or more conditions of the one or more optical fibers includes a decrease in strain for at least one of the one or more optical fibers; and
determining an extent of deployment of the slit-tube boom from the furled state utilizing the determined decrease in strain for the at least one of the one or more optical fibers.

2. The method of claim 1, wherein determining the one or more conditions of the one or more optical fibers coupled with the slit-tube boom include scanning the one or more optical fibers with a light source.

3. The method of claim 2, wherein determining the one or more conditions of the one or more optical fibers coupled with the slit-tube boom further includes performing a cross-correlation of a reference data set with a reflected spectrum produced from scanning the one or more optical fibers.

4. The method of claim 1, wherein determining the one or more conditions of the slit-tube boom includes determining a temperature of the slit-tube boom utilizing the determined one or more conditions of the one or more optical fibers.

5. The method of claim 1, wherein determining the one or more conditions of the slit-tube boom includes determining a deployed shape of the slit-tube boom utilizing the determined one or more conditions of the one or more optical fibers.

6. The method of claim 1, wherein determining the one or more conditions of the slit-tube boom include determining at least a twist of the slit-tube boom, a symmetry of the slit-tube boom, a creep recovery of the slit-tube boom, an axial response of the slit-tube boom, or a transverse response of the slit-tube boom utilizing the determined one or more conditions of the one or more optical fibers.

7. The method of claim 1, wherein the slit-tube boom includes a high strain composite material.

8. The method of claim 1, wherein the one or more optical fibers coupled with the slit-tube boom include at least one optical fiber adhered to a surface of the slit-tube boom.

9. The method of claim 1, wherein the one or more optical fibers coupled with the slit-tube boom include at least one optical fiber embedded between two or more layers of the slit-tube boom.

10. The method of claim 1, wherein the one or more optical fibers include one or more fiber optic sensors.

11. The method of claim 10, wherein the one or more optical fibers include at least two fiber optic sensors.

12. The method of claim 1, further comprising transmitting data over at least one of the one or more optical fibers from one or more components coupled with the slit-tube boom.

13. The method of claim 1, wherein the one or more optical fibers run axially with respect to the slit-tube boom.

14. The method of claim 1, wherein the one or more optical fibers run at least in a circumferential path or in a serpentine path with respect to the slit-tube boom.

15. The method of claim 1, wherein the decrease in strain for the at least one of the one or more optical fibers indicates a transition from the furled shape of the slit-tube boom to a deployed shape of the slit-tube boom.

16. The method of claim 1, wherein the extent of deployment of the slit-tube boom represents a deployed length of the slit-tube boom between the furled state of the slit-tube boom and a fully deployed state of the slit-tube boom.

* * * * *